United States Patent [19]

Chen

[11] Patent Number: 6,121,151
[45] Date of Patent: Sep. 19, 2000

[54] METHOD OF FABRICATING PASSIVATION LAYER IN LIQUID CRYSTAL DISPLAY

[75] Inventor: Wei-Shiau Chen, Chin-Men Hsien, Taiwan

[73] Assignees: United Semiconductor Corp; United Microelectronics Corp, both of Hsinchu, Taiwan

[21] Appl. No.: 09/316,585

[22] Filed: May 21, 1999

[30] Foreign Application Priority Data

Apr. 19, 1999 [TW] Taiwan .................................. 88106208

[51] Int. Cl.⁷ ...................................................... H01L 21/00
[52] U.S. Cl. .............................. 438/692; 216/38; 216/79; 216/88; 216/23; 438/720; 438/723; 438/734
[58] Field of Search ..................................... 438/692, 720, 438/723, 734, 742, 743, 745; 216/23, 38, 79, 88

[56] References Cited

U.S. PATENT DOCUMENTS 6,008,112  12/1999  Acocella et al. ..................... 438/692 X
6,017,821  1/2000   Yang et al. .............................. 438/692

*Primary Examiner*—William Powell
*Attorney, Agent, or Firm*—J. C. Patents; Jiawei Huang

[57] ABSTRACT

A method for fabricating a passivation layer. An isolation layer is formed on a metal layer over the substrate. The isolation layer on the metal layer is removed by chemical-mechanical polishing and dry etching. The planarization of the metal layer thus is obtained. A passivation layer having a certain structure and a thickness combination of different layers is formed over the substrate. The reflection rate of the metal layer is significantly enhanced.

19 Claims, 2 Drawing Sheets

METHOD OF FABRICATING PASSIVATION LAYER IN LIQUID CRYSTAL DISPLAY

CROSS-REFERENCE TO RELATED APPLICATION

This application claims the priority benefit of Taiwan application serial no. 88106208, filed Apr. 19, 1999, the full disclosure of which is incorporated herein by reference.

BACKGROUND OF THE INVENTION

1. Field of the Invention

The present invention relates to a semiconductor fabricating method. More particularly, the present invention relates to a method of liquid crystal display (LCD).

2. Description of the Related Art

Since LCDs have advantages such as a low operating voltage, free of radiation scatter, light weight and small dimension, that the conventional cathode ray tubes (CRT) do not comprise. The LCD and other flat panel displays such as plasma display and electroluminance (EL) display, have thus become the main topic of the recent research on displays. These types of displays are also a leading trend for displays in 21st century.

LCDs substantially comprises a reflection type and a back-light type. Since the reflection-type LCD uses a reflection of an incident light source as the light for display without the application of a back-light source, the power consumption of the reflection-type LCD is lowered. In addition, the design of the reflection-type LCD is lighter and thinner in comparison with the back-light type LCD. Thus, the reflection-type LCD is widely applied in industry.

The substrate structure of the reflection-type LCD uses a metal layer having a smooth surface serving as a light reflection layer. The reflection layer acts as a mirror to reflect most of an incident light. However, as the incident light comes from the outside environment, the light intensity of this external light source is thus weaker than that of the back-light type LCD. Consequently, the displaying effect for the reflection type LCD is worse compared to the back-light type LCD. To optimize the displaying effect, it is often required the reflectance of the incident light source to be maximized.

To obtain an optimum reflectance, a passivation layer is typically formed on a device of the LCD to prevent erosion by moisture in the air and to avoid scratch by external mechanic force. This passivation layer has to be transparent. The structure and thickness of the passivation layer greatly affect the reflectance on a surface metal layer. Should the passivation layer be formed without proper care, an incident light may scatter randomly to reduce the intensity of the reflection, so as to degrade the quality of display.

FIG. 1 is a schematic, cross-sectional view showing a structure of a conventional passivation layer in a liquid crystal display.

In FIG. 1, a variety of devices (not shown) are formed on a substrate 100. An inter-metal dielectric (IMD) layer 110 is formed on the substrate 100. A patterned Ti/TiN layer 112 and a patterned top metal layer 114 are formed in sequence over the substrate 100. There are recesses and trenches, such as an opening 116, formed in the Ti/TiN layer 112 and the top metal layer 114. The opening 116 is formed in the patterned Ti/TiN layer 112 and the patterned top metal layer 114 to expose the inter-metal dielectric layer 110. A silicon oxide layer 120 and a silicon nitride layer 122 together serving as a passivation layer are formed in sequence over the substrate 100 to fill the opening 116.

However, the structure and the thickness of the above-described passivation layer have some drawbacks. In the conventional technique, the opening 116 is formed in the patterned top metal layer 114. The silicon oxide layer 120 and the silicon nitride layer 122 are formed along the opening 116. Thus, it is hard to obtain a planarized contour for the passivation layer. This, in turn, causes the scattering effect of the reflected light to become serious. The high reflectance of the top metal layer thus cannot be achieved.

SUMMARY OF THE INVENTION

The invention provides a method of fabricating a passivation layer for a liquid crystal display. A dielectric layer and a metal layer are formed over the substrate. An opening is formed in the metal layer to expose the dielectric layer. An isolation layer is formed over the substrate to fill the opening. A chemical-mechanical polishing step is performed to planarize the isolation layer until a remaining isolation layer having a certain thickness is left. The remaining isolation layer on the metal layer is removed by dry etching back, the remaining isolation layer is thus in the opening only. A transparent passivation layer is formed on the metal layer. Preferably, the passivation layer comprises a first silicon oxide layer, a first silicon nitride layer, a second silicon oxide layer, and a second silicon nitride layer formed in sequence over the substrate.

In the invention, the preferred thickness of the first silicon oxide layer is about 750 angstroms. The preferred thickness of the first silicon nitride layer is about 640 angstroms. The preferred thickness of the second silicon nitride layer is about 840 angstroms. The preferred thickness of the second silicon nitride layer is about 1200 angstroms.

Because the present invention performs the dry etching step after the chemical-mechanical polishing, the present invention prevents scratches from forming on the top metal layer. A high quality LCD is obtained. In addition, a planarized passivation layer is formed. Thus, the reflection rate of a top metal layer is enhanced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
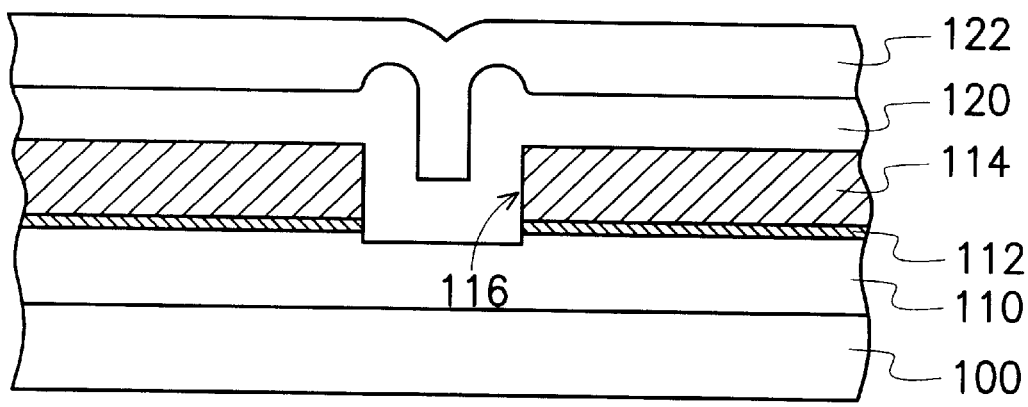
FIG. 1 is a schematic, cross-sectional view showing a structure of a conventional passivation layer in a liquid crystal display.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
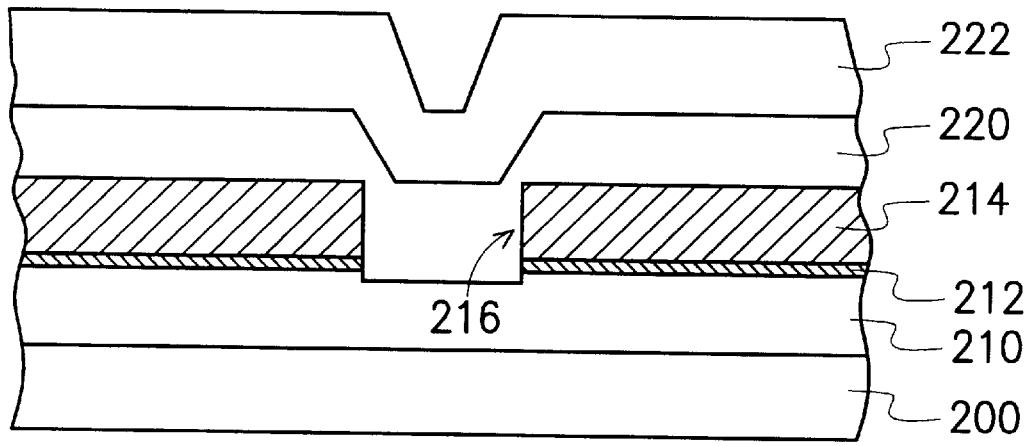
FIGS. 2A through 2D are cross-sectional views showing a method of fabricating a passivation layer in a liquid crystal display according to one preferred embodiment of the invention.

In FIG. 2A, a variety of devices (not shown), such as a metal oxide semiconductor (MOS) transistor, is formed on a substrate 200. A dielectric layer 210, such as an inter-metal dielectric (IMD) layer, is formed on the substrate 200. A glue layer 212 and a top metal layer 214 are formed in sequence over the substrate 200. The glue layer 212 comprises a TiN/Ti layer. The top metal layer 214 comprises an aluminum (Al) layer. There are recesses or trenches, such as an opening 216, in the glue layer 212 and the top metal layer 214. The opening 216, exposing a portion of the dielectric layer 210, serves as an isolation structure. Usually, the dielectric layer 210 exposed by the opening 216 is removed to enhance the isolation.

At the very least, an isolation layer 220 is formed over the substrate 200 to fill the opening 216. The isolation layer 220 is preferably a high-density silicon oxide layer formed by high-density plasma chemical vapor deposition (HDP CVD). The thickness of the isolation layer 220 is preferably about 6000 angstroms. A silicon oxide layer 222 is deposited by plasma-enhanced chemical vapor deposition (PE CVD). The thickness of the silicon oxide layer 222 is preferably about 5000 angstroms. In the invention, the above-described thicknesses of the isolation layer 220 and the silicon oxide layer 222 are advantageous for the following planarization step.

Figure 2B:
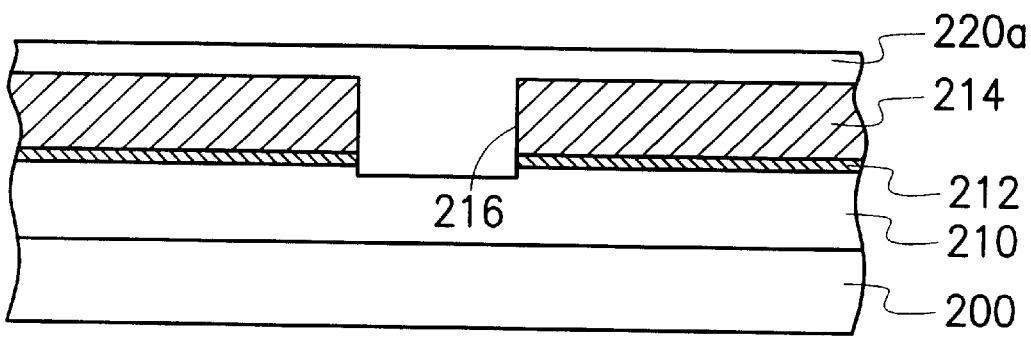

In FIG. 2B, a planarization step is performed. The silicon oxide layer 222 and a portion of the isolation layer 220 are removed. For example, a chemical-mechanical polishing step is performed to remove the silicon oxide layer 222 and the isolation layer 220 until an remaining isolation layer 220a having a preferred thickness is left. The preferred thickness of the isolation layer 220a is about 3500 angstroms, in order to prevent scratches from forming in the surface of the top metal layer 214 in the subsequent step.

Figure 2C:
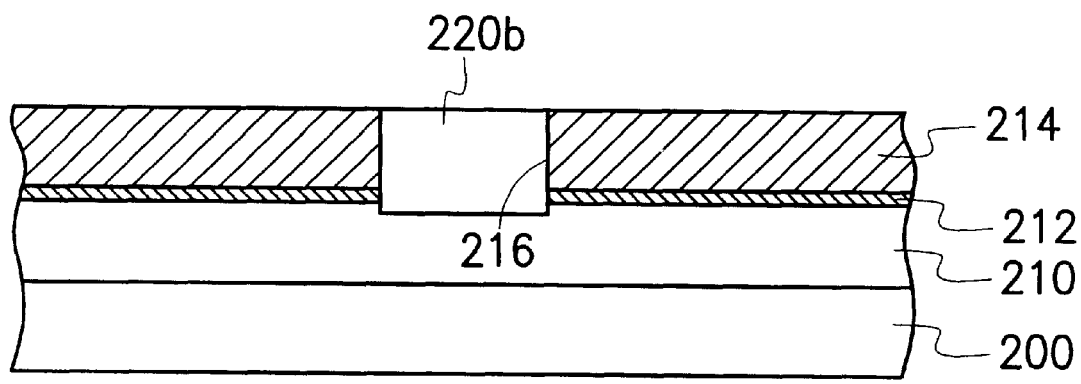

In FIG. 2C, the remaining isolation layer 220a on the top metal layer 214 is removed to leave an isolation layer 220b in the opening 216. The remaining isolation layer 220a can be removed by, for example, dry etching back until the top metal layer 214 is exposed. The isolation layer 220b fills the opening 216 to the surface level of the top metal layer 214. Since the isolation layer 220b fills the opening 216 to the level of the top metal layer 214, a planarized passivation layer (shown in FIG. 2D) is formed in the subsequent step. In addition, the dry etching step is performed by chemical reaction. Therefore, the dry etching step does not scratch the top metal layer 214. The reflection rate of the metal layer 214 is further increased.

Figure 2D:
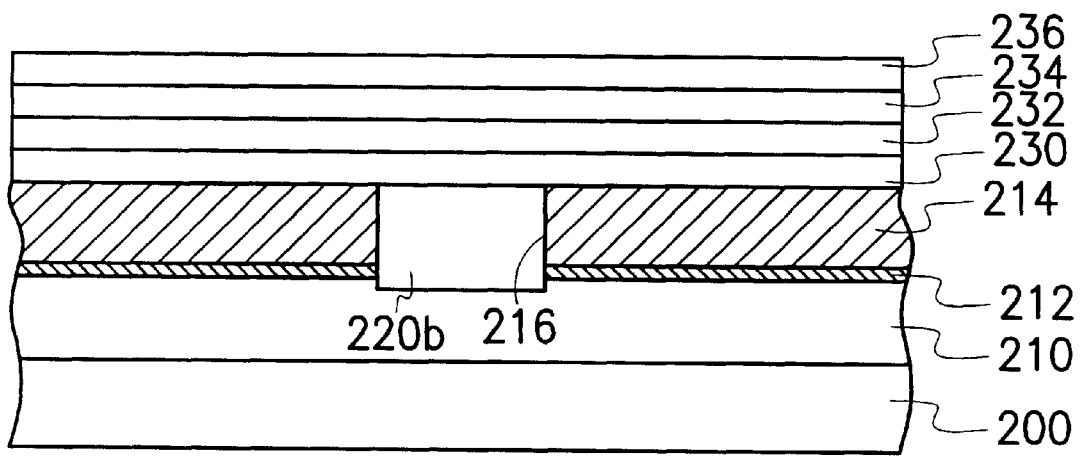

In FIG. 2D, at least a transparent passivation layer is formed on the top metal layer 214 and the silicon oxide layer 220b. For example, a first silicon oxide layer 230, a silicon nitride layer 232, a second silicon oxide layer 234, and a second silicon nitride layer 236 are formed to serve as a passivation layer. The thickness of the first silicon oxide layer 230 is preferably about 750 angstroms. The thickness of the first silicon nitride layer 232 is preferably of about 640 angstroms. The thickness of the second silicon oxide layer 234 is preferably of about 840 angstroms. The thickness of the second silicon nitride layer 236 is preferably of about 1200 angstroms. Preferably, the thickness of each layer in the passivation layer is formed within 10% of the above-described thickness. The reflection rate of the passivation layer formed by the foregoing layers with the preferred thicknesses is increased to above 90%. However, the present invention is not limited in such certain thickness combination and structure of the above-described passivation layer. Any other layers can also be formed to serve as a passivation layer in the invention.

In the invention, there is no scratch formed on a top metal layer. The high quality of the LCD is obtained. In addition, a planarized passivation layer is formed. Thus, the reflectance of a top metal layer is enhanced.

It will be apparent to those skilled in the art that various modifications and variations can be made to the structure and the method of the present invention without departing from the scope or spirit of the invention. In view of the foregoing, it is intended that the present invention cover modifications and variations of this invention provided they fall within the scope of the following claims and their equivalents.

What is claimed is:

1. A method of fabricating a passivation layer suitable for use in a liquid crystal display, comprising the steps of:

forming a dielectric layer and a metal layer over the substrate, wherein an opening is formed in the metal layer to expose a part of the dielectric layer;

forming an isolation layer over the substrate to fill the opening;

performing a chemical-mechanical polishing step to planarize the isolation layer until the isolation layer has a certain thickness remaining;

performing a dry etching back step to remove the isolation layer on the metal layer, in order to leave a portion of the remaining isolation layer filling the opening; and forming a passivation layer on the metal layer.

2. The method of claim 1, wherein the isolation layer comprises a silicon oxide layer.

3. The method of claim 1, wherein the isolation layer is formed by high-density plasma chemical vapor deposition.

4. The method of claim 1, wherein the thickness of the remaining isolation layer is about 3500 angstroms.

5. The method of claim 1, wherein the passivation layer comprises a first silicon oxide layer, a first silicon nitride layer, a second silicon oxide layer, and a second silicon nitride layer formed in sequence over the substrate.

6. The method of claim 5, wherein a thickness of the first silicon oxide layer is about 750 angstroms.

7. The method of claim 5, wherein a thickness of the first silicon nitride layer is about 640 angstroms.

8. The method of claim 5, wherein a thickness of the second silicon nitride layer is about 840 angstroms.

9. The method of claim 5, wherein a thickness of the second silicon nitride layer is about 1200 angstroms.

10. A method of fabricating a passivation layer, comprising the steps of:

forming a dielectric layer and a metal layer on the substrate, wherein an opening is formed in the metal layer to expose a portion of the dielectric layer;

forming a high-density silicon oxide layer over the substrate to fill the opening;

forming a silicon oxide layer on the high-density silicon oxide layer;

performing a chemical-mechanical polishing step to remove the silicon oxide layer and a portion of the high-density silicon oxide layer until a portion of the high-plasma silicon oxide layer having a certain thickness is left;

removing the metal layer and the high-density silicon oxide layer to leave a remaining high-density silicon oxide layer in the opening by dry etching; and forming a transparent passivation layer on the metal layer.

11. The method of claim 10, wherein the isolation layer is formed by high-density plasma chemical vapor deposition.

12. The method of claim 10, wherein a thickness of the high-density silicon oxide is about 6000 angstroms.

13. The method of claim 10, wherein a thickness of the silicon oxide layer is about 5000 angstroms.

14. The method of claim 10, wherein the thickness of the remaining high-density silicon oxide layer is about 3500 angstroms.

15. The method of claim 10, wherein the passivation layer is formed by forming a first silicon oxide layer, a first silicon nitride layer, a second silicon oxide layer, and a second silicon nitride layer in sequence over the substrate.

16. The method of claim 15, wherein a thickness of the first silicon oxide layer is about 750 angstroms.

17. The method of claim 15, wherein a thickness of the first silicon nitride layer is about 640 angstroms.

18. The method of claim 15, wherein a thickness of the second silicon nitride layer is about 840 angstroms.

19. The method of claim 15, wherein a thickness of the second silicon nitride layer is about 1200 angstroms.

* * * * *